(12) United States Patent
van Klooster

(10) Patent No.: US 6,799,475 B2
(45) Date of Patent: Oct. 5, 2004

(54) FLOWMETER

(75) Inventor: Jeroen Martin van Klooster, DJ Tiel (NL)

(73) Assignee: Krohne A.G., Basel (CH)

(*) Notice: Subject to any disclaimer, the term of this patent is extended or adjusted under 35 U.S.C. 154(b) by 129 days.

(21) Appl. No.: 10/241,013

(22) Filed: Sep. 11, 2002

(65) Prior Publication Data

US 2003/0097879 A1 May 29, 2003

(30) Foreign Application Priority Data

Nov. 28, 2001 (DE) .......................................... 101 58 205
Feb. 11, 2002 (DE) .......................................... 102 05 545

(51) Int. Cl.$^7$ ................................................ G01F 1/32
(52) U.S. Cl. .................................................. 73/861.24
(58) Field of Search .......................... 73/861.23, 861.25, 73/861.26, 861.18, 861.19, 861.24

(56) References Cited

U.S. PATENT DOCUMENTS 3,930,173 A * 12/1975 Banko .......................... 310/26
4,742,717 A * 5/1988 Ichino ....................... 73/861.18
5,159,838 A * 11/1992 Lynnworth .................... 73/644
5,515,733 A * 5/1996 Lynnworth ............... 73/861.27
6,073,492 A * 6/2000 Rosselson et al. ............. 73/644
6,584,862 B1 7/2003 Molenaar

FOREIGN PATENT DOCUMENTS

| DE | 4443415 A | 6/1996 |
|----|-----------|--------|
| DE | 19812458 A1 | 10/1999 |
| DE | 19951874 A1 | 5/2001 |
| JP | 61093914 A | 5/1986 |

* cited by examiner

Primary Examiner—Max Noon
(74) Attorney, Agent, or Firm—Cesari and McKenna, LLP

(57) ABSTRACT

A flowmeter includes a measuring tube, an ultrasound transducer, an ultrasound waveguide and a seal. The ultrasound transducer connects outside the measuring tube to the ultrasound waveguide, the ultrasound waveguide protruding at least partly into the measuring tube, in such fashion that ultrasound waves generated by the ultrasound transducer can be transferred to the ultrasound waveguide and, conversely, ultrasound waves received by the ultrasound waveguide can be transferred to the ultrasound transducer, The seal is positioned between the ultrasound waveguide and the measuring tube. This reduces cross coupling while at the same time enhancing the flow pattern.

16 Claims, 3 Drawing Sheets

FLOWMETER

BACKGROUND OF THE INVENTION

This invention relates to a flowmeter incorporating a measuring tube, an ultrasound transducer, an ultrasound waveguide and a seal, said ultrasound transducer connecting outside the measuring tube to the ultrasound waveguide in such fashion that ultrasound waves generated by the ultrasound transducer can be transferred to the ultrasound waveguide and, conversely, ultrasound waves received by the ultrasound waveguide can be transferred to the ultrasound transducer, with the ultrasound waveguide protruding at least partly into the measuring tube.

A flowmeter of this type may be an ultrasound flowmeter or a vortex flowmeter. The ultrasound transducers employed are typically piezoelectric crystals capable of generating and/or detecting ultrasound waves.

There are applications for which it is possible to equip the flowmeter with only an ultrasound transducer without an ultrasound waveguide, the ultrasound transducer serving to generate as well as detect ultrasound waves. In any such design, the ultrasound transducer must be directly positioned at the point where the ultrasound waves are introduced or detected. That, however, tends to create a problem insofar as the piezoelectric crystals which, as pointed out above, are typically used as the ultrasound transducers in flowmeters, cannot be used above a certain temperature, the so-called Curie temperature. This is because above the Curie temperature, the crystal no longer possesses a ferroelectric or ferromagnetic phase, the prerequisite for the piezoelectric properties of the crystal.

Therefore, in cases where for instance the moving fluid whose flow rate is to be measured by the ultrasound flowmeter is so hot that its temperature is above the Curie temperature of the piezoelectric crystal, any reliable operation requires a certain thermal insulation of the ultrasound transducer from the hot fluid. It is for that reason that flowmeters are equipped with ultrasound transducers so configured as to leave a spatial clearance between the ultrasound transducer and the hot fluid. The ultrasound waveguide in that configuration must ensure the best possible thermal insulation between the ultrasound transducer and the hot fluid while at the same time optimizing a loss-free and unimpeded transfer of the ultrasound waves. In other words, the design of an ultrasound waveguide where the ultrasound transducer is located at a distance from the hot fluid or at least thermally insulated from that fluid enables the ultrasound transducer to inject ultrasound waves generated by it into the moving fluid and to receive the ultrasound waves from the hot fluid.

Conventional flowmeters equipped with an ultrasound transducer and an associated ultrasound waveguide employ ultrasound waveguides of the type as described, for instance, in WO 96/41157. The ultrasound waveguide according to that design incorporates multiple, mutually parallel, very thin rods, with the diameter of the individual rods being significantly smaller than the wavelength of the ultrasound signal to be conducted. The rods are typically bundled closely together and fitted into a tube that supports them laterally and constitutes a jacket for the ultrasound waveguide, thus making for a compact ultrasound waveguide design.

WO 96/41157 also describes an ultrasound waveguide design in which metal plates, bent in an essentially circular shape, are interleaved at a distance from one another. These rounded metal plates are again housed in a tube that constitutes the outer enclosure of the ultrasound waveguide.

EP 1 098 295 on its part describes an ultrasound waveguide that consists of a rolled-up foil fitted tightly into a metal tube. For transmitting ultrasound waves in the frequency range from 15 kHz to 20 kHz, the thickness of the foil layers is less than 0.1 mm. The foil typically consists of a metallic material.

According to the generally applied design concept, the ultrasound transducer is positioned at one end of the ultrasound waveguide in such fashion that the ultrasound transducer can feed ultrasound waves into, and receive them from, the ultrasound waveguide. The ultrasound transducer is usually plugged into one end of the ultrasound waveguide and thus is in direct physical contact with it. In the case of the aforementioned ultrasound waveguide with the rolled-up foil according to EP 1 098 295, the ends of the ultrasound waveguide are usually welded up and faced, and the ultrasound transducer is mounted on that welded, flat end face of the ultrasound waveguide.

As stated above, the ultrasound waveguide in flowmeters of the type to which this invention relates protrudes at least partly into the measuring tube. This allows the ultrasound waveguide to make direct contact with the fluid into which ultrasound waves are to be injected and from which ultrasound waves are to be received. That, however, poses a problem insofar as the measuring tube with the inserted ultrasound transducer must be sealed toward the outside. One way to solve that is to fit the jacket of the ultrasound waveguide directly into the measuring tube and seal it for instance by welding. Another way is to fit the ultrasound waveguide into a flange, again sealed for instance by welding, and to then attach that flange to a corresponding flange on the measuring tube, with the seal provided between the two flanges.

If the ultrasound waveguide is at least partly inserted into the measuring tube via a flange, a corresponding adapter may be provided on the measuring tube. In that case the waveguide does not have to extend into the measuring tube past the outer wall of the latter. Nevertheless, as intended by this invention, the waveguide protrudes at least partly into the measuring tube due to the fact that the waveguide is positioned in the cavity created by the adapter that connects directly to the interior of the measuring tube. In other words, the invention is not limited to configurations where the waveguide is at least partly inserted into the measuring tube in a manner whereby it protrudes into the interior of the measuring tube itself. Indeed, the waveguide may even be set back from the measuring tube proper. All that matters is that the waveguide, by virtue of its at least partial insertion in the measuring tube, is at least in indirect contact with the fluid passing through the measuring tube.

What poses a problem, however, is the fact that mounting a flange on the measuring tube, typically via an adapter, creates the cavity referred to above, which could interfere with the flow of the fluid in the measuring tube. In other words, the fluid might penetrate into the cavity created by the adapter and thus all the way to the seal between the two flanges which, in turn, requires a seal that can withstand the temperature of what may be a very hot fluid. This limits the available options for the gasket material while at the same time having a negative effect on the suppression of cross coupling, or a phenomenon referred to as crosstalk.

The problem with the flowmeter designs discussed is that the ultrasound waves generated by the ultrasound transducer, when transmitted, are injected not only into the ultrasound waveguide but also into the jacket encasing the ultrasound waveguide. Conversely, when the ultrasound transducer is intended to detect ultrasound waves, the ultrasound waves reach the ultrasound transducer not only via the ultrasound waveguide but via the jacket as well. It follows that the ultrasound waves transmitted or detected by the ultrasound transducer are waves transferred by both the ultrasound waveguide and the surrounding jacket. Now if it is by way of its jacket that the ultrasound waveguide is installed in and connected to the wall of the measuring tube carrying the fluid whose flow rate is to be determined, not only the ultrasound waves passing through the fluid but also those ultrasound waves that travel through the wall of the tube to and from the ultrasound transducer will be collected. The resulting crosstalk phenomenon may lead to a heterodyning or even total disruption of the measuring signal that is actually of interest.

The problem associated with that is highlighted by the realization that even when switching between two different fluids, and disregarding any geometry-related effects, the ultrasound transmission coefficient will be:

$$T=4(z_1/z_2)/(1+z_1/z_2)^2$$

where $z_1$ and $z_2$ are the characteristic im fluid between which the ultrasound waves are switched. For a transition from steel to air, the aforementioned transmission coefficient T is approximately 0.004%, meaning that a significant part of the acoustic energy, 99.996% to be exact, is lost. A substantial component of this lost energy reappears in the form of undesirable crosstalk. It follows that this crosstalk is a key factor in the determination of the signal-to-noise ratio of the flowmeters discussed here.

SUMMARY OF THE INVENTION

It is therefore the objective of this invention to provide a flowmeter of the type described above, so improved in design that cross coupling and crosstalk are further reduced and at the same time any interference with the flow of the fluid through the measuring tube is minimized.

With reference to the flowmeter design first above described, this invention achieves that objective by positioning the seal between the ultrasound waveguide and the measuring tube. Thus, according to the invention, the ultrasound waveguide is not directly connected to the measuring tube and the seal is not located between a flange to which the ultrasound waveguide is attached and some corresponding flange on the measuring tube.

The approach according to this invention whereby the seal is positioned between the ultrasound waveguide and the measuring tube, offers several advantages. For one, the seal that consists of a material other than that of the measuring tube, reduces the transfer of acoustic energy as compared to a situation where the ultrasound waveguide is mounted directly into the wall of the measuring tube. In other words, the coefficient of transmission at this transition point is very small. Moreover, the concept according to this invention makes it possible even in cases where the measuring tube is provided with an adapter, to install the seal in such fashion that next to no additional cavity space is created in the measuring tube. Consequently, there is virtually no turbulence caused in the fluid passing through the measuring tube, which, in turn, enhances the measuring accuracy of the flowmeter.

A particularly tight seal is obtained in a preferred refinement of this invention with a seal that applies radial pressure on the ultrasound waveguide. Preferably, therefore, the sealing gasket is attached along the perimeter of the ultrasound waveguide.

The seal according to this invention can be established in a manner whereby the gasket is placed between the ultrasound waveguide and the measuring tube proper. However, in a preferred embodiment of this invention, the measuring tube is provided with an adapter, the ultrasound waveguide is inserted in the measuring tube via that adapter and the seal is placed between the ultrasound waveguide and the adapter. The adapter may be solidly connected to the measuring tube. In a preferred embodiment of this invention, however, the adapter is detachably mounted on the measuring tube, facilitating the assembly process.

This invention further relates to a flowmeter with a measuring tube, an ultrasound transducer, an ultrasound transducer mount and a seal, with the ultrasound transducer so attached to the ultrasound transducer mount, and the ultrasound transducer mount at least partly inserted in the measuring tube, such that ultrasound waves generated by the ultrasound transducer can be transmitted via the ultrasound transducer mount into a fluid passing through the measuring tube and/or, conversely, ultrasound waves emanating from the fluid can be transferred via the ultrasound transducer mount to the ultrasound transducer.

A flowmeter with an ultrasound transducer mount would pose problems similar to those associated with flowmeters, as described further above, employing an ultrasound waveguide.

Accordingly, the invention is also aimed at improving the flowmeter design described above so as to further reduce cross coupling and crosstalk while at the same time minimizing any interference with the flow of the fluid through the measuring tube.

Progressing from the above-described flowmeter design with an ultrasound transducer mount, this objective is achieved by positioning the seal between the ultrasound transducer mount and the measuring tube.

According to a preferred, enhanced implementation of the invention, the seal is again installed in such a way as to press radially against the ultrasound transducer mount and preferably against the perimeter of the ultrasound transducer mount.

For both the flowmeter with an ultrasound waveguide and the flowmeter with an ultrasound transducer mount, the seal in a preferred implementation of the invention is in the form of a ring-shaped gasket. Other gasket shapes are essentially possible but an annular gasket provides a particularly good seal. Particular preference is given to a seal in the form of a packing made up of multiple annular gaskets. Best suited is a packing of annular seals of the type used in other technical fields as well, such as a valve-stem packing for sealing a longitudinally moving valve stem. Of course, only the stationary sealing performance of the annular packing is important; the ability of a valve-stem packing to seal even a longitudinally moving stem is not critical in this case since the ultrasound waveguide and the ultrasound transducer mount discussed here remain essentially motionless during the operation of the flowmeter, i.e. they remain stationary. Only temperature fluctuations could cause minor shifts.

While in essence the annular seals could consist of any one of a great many suitable materials, the annular seals in a preferred embodiment per this invention consist of graphite, polytetrafluoroethylene (PTFE) and/or perfluoroelastomer. These materials have proved to be particularly reliable when used for very hot and/or chemically aggressive fluids.

When one or several annular gaskets are provided, there is generally no need for any further sealing provisions. However, in a further, preferred refinement of the invention, the packing with one or several annular gaskets is pressure-loaded in a vertical direction relative to the plane of the seal. This is preferably accomplished by means of a set of spring washers which are positioned in a way that, held in place by a stop on the far side of the seal, they exert top or, respectively, bottom pressure on the seal which on its part is held in place by a lug. This compresses the material of the seal in the direction in which the pressure is exerted and the material gives in a perpendicular direction, i.e. both toward the inside and the outside, further improving the sealing effect by virtue of the pressure bearing on the ultrasound waveguide or ultrasound transducer mount, as the case may be. According to another refinement of the invention, the sealing effect of the pressure-loaded seal is further improved by using annular gaskets with a V-shaped i.e. flared cross section. This flared profile subserves the mentioned inward and outward give of the sealing material, thus further enhancing the sealing effect. On the other hand, gaskets with a triangular cross section have also proved to be effective.

BRIEF DESCRIPTION OF THE DRAWINGS

There are numerous ways and possibilities for configuring and further refining the flowmeters per this invention. In this connection, reference is made to the claims and to the following detailed description of preferred embodiments of this invention and to the drawings, in which:

DETAILED DESCRIPTION OF AN ILLUSTRATIVE EMBODIMENT

Figure 1:
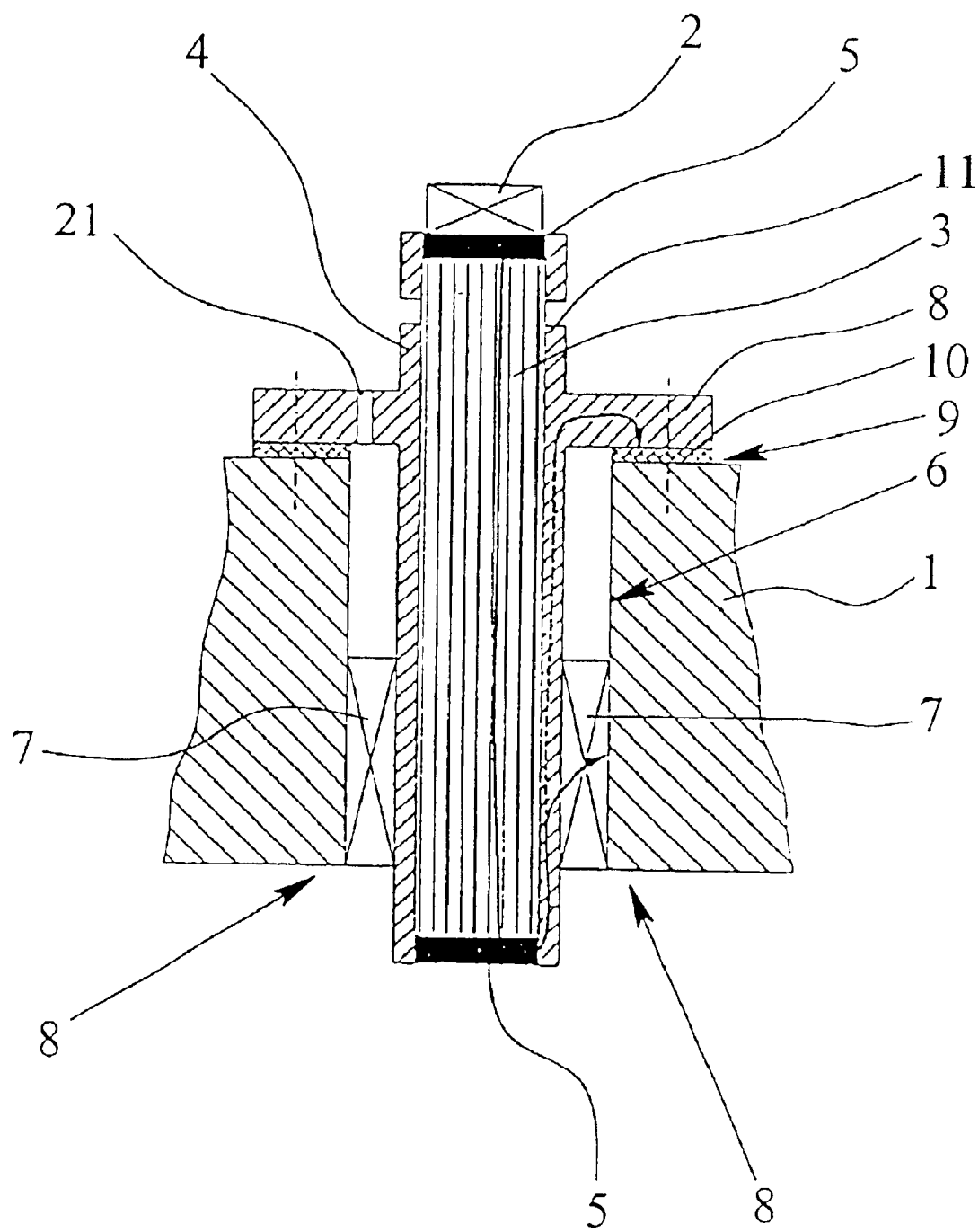
FIG. 1 shows the configuration of an ultrasound transducer with an ultrasound waveguide in the measuring tube of a flowmeter according to a first preferred embodiment of the invention.

Depicted in FIG. 1 is a section of a measuring tube 1 in which ultrasound waves generated by an ultrasound transducer 2 can be coupled into the measuring tube via an ultrasound waveguide 3. The ultrasound waveguide 3 consists of a thin, rolled metal foil with a foil thickness of about 0.1 mm. The metal foil is enclosed by a jacket 4 that serves to laterally seal the ultrasound waveguide 3 toward the outside. The jacket 4 of the ultrasound waveguide 3 is likewise made of metal. The ends 5 of the roll of thin metal foil are faced and welded up. Outside the measuring tube 1, the ultrasound transducer 2 is mounted on an end face 5 of the ultrasound waveguide 3.

A packing 7 is installed to seal the jacket 4 of the ultrasound waveguide 3 from the inner wall of a recess 6 provided in the measuring tube 1. That packing 7 is an assembly of annular gaskets that radially extend on one side to the jacket 4 of the ultrasound waveguide 3 and on the other side to the inner wall of the recess 6. At the inner end of the recess 6 in the measuring tube 1, the packing 7 is exactly flush with the adjoining areas 8 of the measuring tube 1. In this fashion, the fluid, not shown, passing through the measuring tube, does not encounter the recess 6 in the measuring tube 1, i.e. the recess 6 does not disturb the flow of the fluid. A certain minor disturbance is caused only by the fact that over a short distance, the ultrasound waveguide 3 extends into the moving fluid.

Next to the packing 7, a decoupling ring 10 is mounted between a flange 8 attached to the jacket 4 of the ultrasound waveguide 3 and the outside 9 of the measuring tube 1. That decoupling ring 10 does not have to serve as a seal between the measuring tube 1 and the outside world since the packing 7 already provides that sealing function for the measuring tube 1. Besides, the space between the flange 8 and the packing 7 is preferably vented, i.e. it is not sealed, for which purpose a vent hole 21 is provided in the flange 8.

As an important aspect in this configuration, the decoupling ring 10 must not come in contact with the fluid, so as to obviate the need for the decoupling ring 10 to be particularly heat-resistant or resistant to chemically aggressive substances. Accordingly, there are many options in the selection of the material for the decoupling ring 10 and one is free to choose a material for the decoupling ring 10 that permits only a low-level transmission of any acoustic energy through the jacket 4 and the flange 8 or the measuring tube 1. As a result, any cross coupling or crosstalk along that path is severely suppressed.

However, cross-coupling and crosstalk suppression is also afforded by using for the seal a packing 7 that consists of a set of annular gaskets. It has, in fact, been found that the transmission of acoustic energy from the jacket 4 of the ultrasound waveguide 3 via a packing 7 of that type and into the measuring tube 1 is quite minimal. This low-level transmission of acoustic energy through the packing 7 and through the decoupling ring 10 is indicated in FIG. 1 by arrows that represent the path of the ultrasound waves emanating from the ultrasound transducer 2 and end at the points concerned.

In addition, as shown in FIG. 1, the jacket 4 of the ultrasound waveguide 3 is provided at its end facing the ultrasound transducer 2 with a groove 11 that extends over the entire circumference of the ultrasound waveguide 3. This groove 11 cuts through the entire thickness of the jacket 4, with the result that, as indicated by the arrows, acoustic energy cannot be directly coupled into the jacket 4 in proximity to the ultrasound transducer 2. Any acoustic energy that travels through the jacket 4 and then through the packing 7 and/or the decoupling ring 10, finally reaching the measuring tube, must pass through the entire length of the ultrasound waveguide 3. That makes the distance traveled by the ultrasound waves engendering the cross coupling substantially longer than the path of the actual measuring signal, so that the noise signal caused by cross coupling can be expected to arrive with a considerable time delay after the actual measuring signal. That in turn greatly facilitates discrimination between the measuring signal and interference signals originating from cross coupling.

Figure 2:
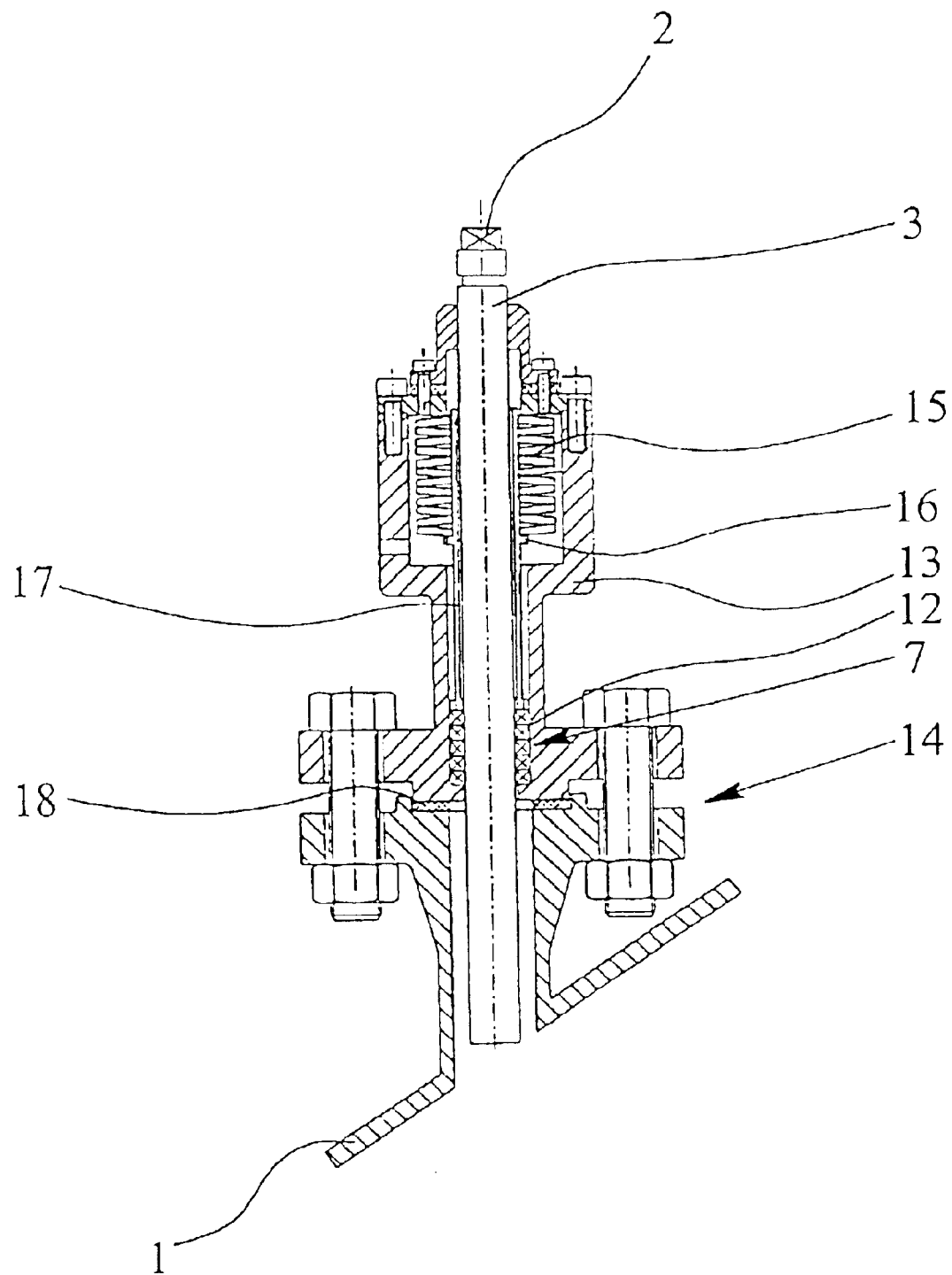
FIG. 2 shows the configuration of an ultrasound transducer with an ultrasound waveguide in the adapter of a measuring tube according to a second preferred embodiment of the invention.

FIG. 2 illustrates a configuration including an ultrasound transducer 2, an ultrasound waveguide 3 and a seal 7 in the form of a packing with multiple annular gaskets 12, shown individually. In this case, the annular gaskets 12 preferably consist of graphite, PTFE or a perfluoroelastomer. In this configuration according to FIG. 2, reflecting a second preferred embodiment of the invention, the ultrasound transducer 2 with the ultrasound waveguide 3 is attached to the measuring tube 1 via an adapter 13. The adapter 13 on its part is detachably connected to the measuring tube 1 via a flanged junction 14.

In this second preferred embodiment of the invention, it is also important for the annular gaskets 12 to be pressure-loaded from the top. To that effect, a set of spring washers 15 is provided above the annular gaskets 12, pressing down on the uppermost annular gasket 12 by way of a tube 17 provided with a stop lug 16. As a result of the compressive force applied on the annular gaskets 12, the material of these annular gaskets 12 expands toward the inside and the outside, thus augmenting the sealing effect on the ultrasound waveguide 3 and the inside of the adapter 13. The flanged junction 14 is sealed by means of an O-ring 18.

Figure 3:
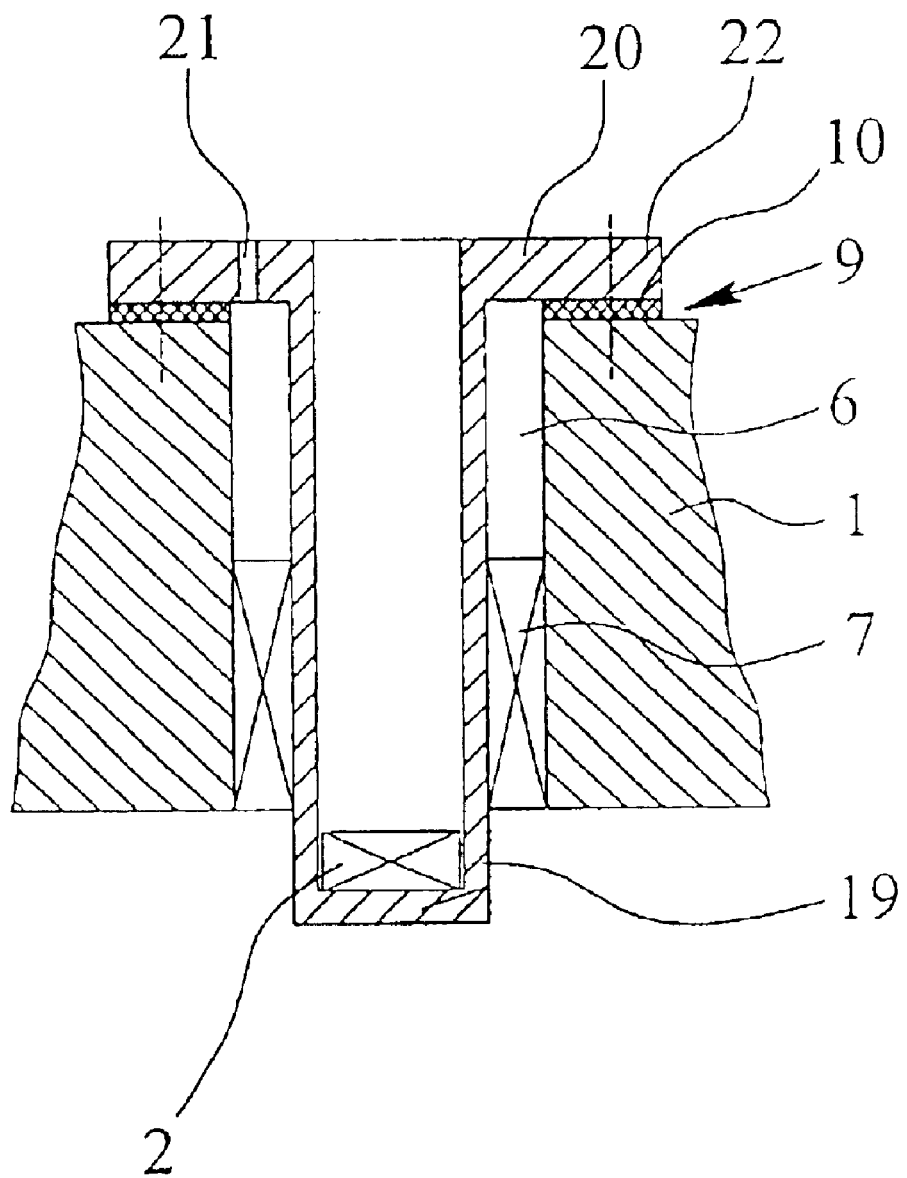
FIG. 3 shows the configuration of an ultrasound transducer with an ultrasound transducer mount in the measuring tube of a flowmeter according to a third preferred embodiment of the invention.

Finally, FIG. 3 illustrates a configuration representing a third preferred embodiment of the invention. This design does not include an ultrasound waveguide, but an ultrasound transducer mount 19 by means of which it is possible to physically position the ultrasound transducer 2 very close to the fluid that flows through the measuring tube 1. Of course, this particular design is practical only where the fluid passing through the measuring tube 1 is not too hot, meaning that, when the ultrasound transducer 2 employs a piezoelectric crystal, its Curie temperature is not exceeded.

In this case, the seal is in the form of a packing 7 positioned between the inner wall of a recess 6 in the measuring tube 1 and the outer wall of the ultrasound transducer mount 19. The packing 7 again consists of a set of annular gaskets, not individually illustrated in this case. And again, the seal 7 is installed in a way that the recess 6 does not create a cavity in the measuring tube 1 that could otherwise interfere with the flow of the fluid through the measuring tube 1.

In this third preferred embodiment of the invention, a venting hole 21 and a decoupling ring 10 are also provided. The decoupling ring 10 is positioned between a flange 22 attached to the ultrasound transducer mount 19 and the outside surface of the measuring tube 1. Based on the same functional principle as in the other preferred embodiment of the invention described above, effective attenuation of the acoustic energy penetrating through the seal 7 and the decoupling ring 10 minimizes the extent of any cross coupling in this design as well.

What is claimed is:

1. A flowmeter, with a measuring tube, an ultrasound transducer, an ultrasound waveguide and a seal, said ultrasound transducer connecting outside the measuring tube to the ultrasound waveguide in such fashion that ultrasound waves generated by the ultrasound transducer are transferred to the ultrasound waveguide and, conversely, ultrasound waves received by the ultrasound waveguide are transferred to the ultrasound transducer, said ultrasound waveguide protruding at least partly into the measuring tube, wherein the seal is positioned between the ultrasound waveguide and the measuring tube, and the seal is pressure-loaded in a vertical direction relative to the plane of the seal.

2. The flowmeter as in claim 1, wherein the annular gaskets have a V-flared or triangular cross section.

3. The flowmeter as in claim 1 or 2, wherein the pressure-loading is accomplished by means of a set of spring washers.

4. The flowmeter as in claim 1 or 2, wherein the seal is effective on the ultrasound waveguide in a radial direction.

5. The flowmeter as in claim 1 or 2, wherein the seal is applied so as to fit closely against the perimeter of the ultrasound waveguide.

6. The flowmeter as in one of the claim 1 or 2, wherein the seal is positioned on the side of the ultrasound waveguide facing away from the ultrasound transducer.

7. The flowmeter as in claim 1 or 2, wherein the measuring tube is provided with an adapter, and the ultrasound waveguide is inserted in the measuring tube by way of said adapter and the seal is positioned between the ultrasound waveguide and the adapter.

8. The flowmeter as in claim 7, wherein the adapter is attached to the measuring tube in a removable fashion.

9. A flowmeter, with a measuring tube, an ultrasound transducer, an ultrasound transducer mount and a seal, said ultrasound transducer being attached to the ultrasound transducer mount, and the ultrasound transducer mount at least partly protruding into the measuring tube in such fashion that ultrasound waves generated by the ultrasound transducer are transmitted via the ultrasound transducer mount into a fluid flowing through the measuring tube and, conversely, ultrasound waves received from the fluid are transferred via the ultrasound transducer mount to the ultrasound transducer, wherein the seal is positioned between the ultrasound transducer mount and the measuring tube, and the seal is pressure-loaded in a vertical direction relative to the plane of the seal.

10. The flowmeter as in claim 9 wherein the annular gaskets have a V-flared or triangular cross section.

11. The flowmeter as in 9 or 10 wherein the pressure-loading is accomplished by means of a set of spring washers.

12. The flowmeter as in claim 9 or 10 wherein the seal is effective on the ultrasound transducer mount in a radial direction.

13. The flowmeter as in claim 9 or 10 wherein the seal is applied so as to fit closely against the perimeter of the ultrasound transducer mount.

14. The flowmeter as in claim 1 or 9 wherein the seal is ring-shaped.

15. The flowmeter as in claim 14 wherein the seal is in the form of a packing comprised of annular gaskets.

16. The flowmeter as in claim 15 wherein the annular gaskets consist of graphite, PTFE and/or perfluoroelastomer.

* * * * *